United States Patent [19]

Eckhardt et al.

[11] Patent Number: 4,801,677

[45] Date of Patent: Jan. 31, 1989

[54] THERMOTROPIC AROMATIC POLYESTER WITH HIGH THERMAL STABILITY

[75] Inventors: Volker Eckhardt; Hans-Rudolf Dicke; Ludwig Bottenbruch; Dieter Freitag, all of Krefeld; Ulrich Biskup, Cologne, all of Fed. Rep. of Germany

[73] Assignee: Bayer Aktiengesellschaft, Leverkusen-Bayerwerk, Fed. Rep. of Germany

[21] Appl. No.: 3,586

[22] Filed: Jan. 15, 1987

Related U.S. Application Data

[63] Continuation-in-part of Ser. No. 819,417, Jan. 16, 1986, abandoned.

[30] Foreign Application Priority Data

| Jan. 25, 1985 [DE] | Fed. Rep. of Germany | 3502378 |
| Jan. 11, 1986 [EP] | European Pat. Off. | 86100293.9 |
| Jan. 21, 1986 [JP] | Japan | 61-9065 |

[51] Int. Cl.$^4$ ............................................. C08G 63/18
[52] U.S. Cl. ......................................... 528/176; 528/271
[58] Field of Search ................................. 528/176, 271

[56] References Cited

U.S. PATENT DOCUMENTS 4,474,938 10/1984 Richardson ..................... 528/176

FOREIGN PATENT DOCUMENTS 2339637 8/1977 France.

Primary Examiner—Harold D. Anderson
Attorney, Agent, or Firm—Connolly & Hutz

[57] ABSTRACT

Thermotropic aromatic polyesters which contain condensed radicals of bis-α, ω-(4-hydroxyphenyl)-n-alkanes, have high dimensional stability under heat and at the same time high thermal stability. They can be processed thermoplastically at temperatures below 370° C.

7 Claims, No Drawings

THERMOTROPIC AROMATIC POLYESTER WITH HIGH THERMAL STABILITY

This is a continuation-in-part application of parent application Ser. No. 819,417, filed Jan. 16, 1986, now abandoned.

This invention relates to high molecular weight thermotropic aromatic polyesters having high dimensional stability under heat, high thermal stability and good processibility, a process for the production of these polyesters and the use thereof for the production of mouldings, filaments, fibres and films.

Substances which form liquid crystalline melts are designated as "thermotropic". Thermotropic polyesters are fairly well known; see, for example, F. E. McFarlane et al., Liquid Crystal Polymers II, Contemporary Topics in Polymer Science, Vol. 2, Plenum Publishing Corporation, 1977;

W. J. Jackson and H. F. Kuhfuss, J. Polymer Science, Polymer Chem. Ed. 14, 2042 (1976);

W. C. Wooten et al. in A. Ciferri "Ultra-high Modulus Polymers", Applied Science Publ., London 1979, p. 362 et seq.;

A. Blumstein et al., "Liquid Crystalline Order in Polymers", Academic Press 1978;

J. Preston, Angew. Makromol. Chem. 109/110, 1-19 (1982);

A. Ciferri, W. R. Krigbaum, R. B. Meyer "Polymer Liquid Crystals", Academic Press, New York, 1982;

EP-A Nos. 1185, 8855, 15 856, 17 310, 18 145, 18 709, 22 344, 44 205, 49 615;

U.S. Pat. Nos. 3,991,013, 3,991,014, 4,066,620, 4,083,829, 4,107,143;

WO 79/797, 79/1030, 79/1040.

The liquid crystalline state of polymer melts may be examined using a polarisation microscope. For the investigations, the eye-piece was provided with a cap having a photodiode arranged in the focal point of the ocular lens. The measured value on the connected microscope in the case of Nicol prisms arranged in parallel was adjusted in the absence of a material sample to 100 graduations by means of a subsequent measuring amplifier with control device. A value of 0.01 graduations was produced with crossed Nicol prisms.

The examined polyester melts had a layer thickness of 100 $\mu$m.

The polyesters were examined after melting the samples at temperatures of between 200° and 400° C. If brightening of the melt observed between the crossed Nicol prisms occurred in this total range or in a proportion thereof, the polyester was classified as thermotropically liquid crystalline.

The liquid crystalline polyesters have values above 1 graduation, usually values of from 3 to 90 graduations, in the measuring arrangement. For amorphous melts, for example aromatic polycarbonates, on the other hand, values of less than 0.1 graduation were found.

The method described above is particularly suitable for rapid determination in the laboratory and produces unambiguous results in almost all cases. In doubtful cases, on the other hand, it may be worth demonstrating the presence of liquid crystalline components by means of wide-angle X-ray scattering in the melt, as described, for example, by G. W. Gray and P. A. Windsor, "Plastic Crystals, Physico-Chemical Properties and Methods of Investigation", in particular chapter 3, John Wiley & Sons, New York, Sydney, Toronto, 1974.

Mouldings and films having exceptional mechanical properties can be produced from thermotropic polyesters by thermoplastic shaping and fibres having exceptional mechanical properties can be produced by spinning from the melt. However, the polyesters must be meltable without decomposition. A sufficiently low melting temperature is also desirable to permit thermoplastic processing on the existing machinery. The simplest fully aromatic polyesters such as poly-(4-hydroxybenzoate) and poly-(1,4-phenyleneterephthalate) do not meet these requirements. They melt and decompose at about 600° C.

Thermotropic polyesters composed of three or more monomers can be processed thermoplastically (DE-OS Nos. 27 04 315, 27 21 786, 27 51 653, 28 34 537, 28 44 817, 20 32 178, 29 63 833, EP-A Nos. 1340, 30 182, 69 587, U.S. Pat. Nos. 4,153,779, 4,245,082, 4,279,803, 4,355,134, 4,371,660, 4,391,966). All these products have the common disadvantage, however, that the desirable lowering of the melting point is accompanied by an undesirable reduction in the dimensional stability under heat. In some cases, the dimensional stability under heat can be increased by thermal aftertreatment of the fibres, films or mouldings produced from these thermotropic copolyesters. However, the thermal after treatment is expensive and therefore uneconomical.

Other thermotropic polyesters containing aliphatic structural units (DE-OS Nos. 27 24 700, 27 24 738, EP-A Nos. 10 051, 11 640, U.S. Pat. Nos. 3,778,410, 3,804,805, 3,890,256) are thermoplastically processible, but this is at the expense of a decline in the dimensional stability under heat. In most cases, the thermal stability of the products is not satisfactory. Moreover, decomposition reactions can take place during processing.

An object of the invention was to provide thermotropic polyesters having high dimensional stability under heat, high thermal resistance and good processibility.

The dimensional stability under heat (without thermal after-treatment) should generally be at least 150° C., preferably at least 200° C. (measured in accordance with Vicat B, ASTM D No. 1525 in each case).

The thermal stability should correspond to a weight loss of at most 3, preferably at most 2 and, in particular, at most 1% by weight in isothermal gravimetric analysis (30 minutes/350° C.).

The temperature of the transition from the crystalline into the liquid crystalline phase (melting point) determined by DSC should be less than 370° C., preferably less than 340° C. and, in particular less than 300° C.

It has surprisingly been found that thermotropic polyesters have the desired combination of advantageous properties if their diphenol radicals are composed predominantly or solely of bis-$\alpha,\omega$-(4-hydroxyphenyl)-$C_6$-$C_{12}$-n-alkane radicals.

The invention accordingly relates to thermotropic polyesters composed of aromatic dicarboxylic acid radicals, diphenol radicals, optionally radicals of chain terminators and/or branching agents, characterised in that at least 90 mol%, preferably at least 95 mol%, in particular at least 98 mol%, of the diphenol radicals correspond to the formula (I):

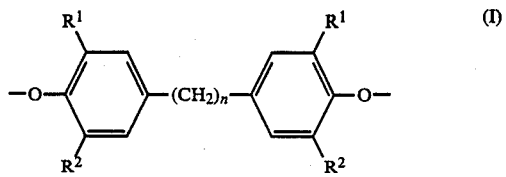

wherein $R^1$, $R^2$ represent hydrogen, $C_1$–$C_4$-alkyl, $C_1$–$C_4$-alkoxy, phenyl or halogen (preferably chlorine or bromine) and n is an integer of from 6 to 12.

Particularly preferred polyesters contain only radicals corresponding to formula (I) as diphenol radicals.

Preferred aromatic dicarboxylic acids contain from 8 to 24, particular from 8 to 16 carbon atoms. These include, for example, 4,4'-biphenyl dicarboxylic acid, 4,4'-stilbene dicarboxylic acid, 4,4'-tolane dicarboxylic acid, 4,4'-azobenzene dicarboxylic acid, 2,6-naphthalene dicarboxylic acid, 1,4-naphthalene dicarboxylic acid and 1,5-naphthalene dicarboxylic acid, but in particular terephthalic acid. Particularly preferred aromatic dicarboxylic acids bear the two carboxyl groups on opposing coaxial or parallel bonds.

Preferred diphenols include, for example, bis-1,6-(4-hydroxyphenyl)-n-hexane, bis-1,7-(4-hydroxyphenyl)-n-heptane, bis-1,8-(4-hydroxyphenyl)-n-octane, bis-1,9-(4-hydroxyphenyl)-n-nonane, bis-1,10-(4-hydroxyphenyl)-n-decane, bis-1,11-(4-hydroxyphenyl)-n-undecane, bis-1,12-(4-hydroxyphenyl)-n-dodecane; bis-1,6-(3,5-dichloro-4-hydroxyphenyl)-n-hexane, bis-1,7-(3,5-dichloro-4-hydroxyphenyl)-n-heptane, bis-1,8-(3,5-dichloro-4-hydroxyphenyl)-n-octane, bis-1,9-(3,5-dichloro-4-hydroxyphenyl)-n-nonane, bis-1,10-(3,5-dichloro-4-hydroxyphenyl)-n-decane, bis-1,11-(3,5-dichloro-4-hydroxyphenyl)-undecane; bis-1,12-(3,5-dichloro-4-hydroxyphenyl)-dodecane; bis-1,6-(3,5-dimethyl-4-hydroxyphenyl)-n-hexane, bis-1,7-(3,5-diemthyl-4-hydroxyphenyl)-n-heptane, bis-1,8-(3,5-dimethyl-4-hydroxyphenyl)-n-octane, bis-1,9-(3,5-dimethyl-4-hydroxyphenyl)-n-nonane, bis-1,10-(3,5-dimethyl-4-hydroxyphenyl)-n-decane, bis-1,11-(,3,5-dimethyl-4-hydroxyphenyl)-n-undecane and bis-1,12-(3,5-dimethyl-4-hydroxyphenyl)-dodecane.

Compounds in which both $R^1$ and $R^2$ represent hydrogen are particularly preferred diphenols.

The best polyesters are those whose dicarboxylic acid radicals and diphenol radicals each consist of only one component, i.e. homopolyester. The polyesters according to the invention, however, can also contain more than one dicarboxylic acid component and/or more than one diphenol component—preferably selected from the dicarboxylic acids and diphenols defined above. However, they can also contain radicals of other dicarboxylic acids such as aliphatic $C_4$–$C_{14}$-dicarboxylic acids (succinic, adipic, sebacic acid), and radicals of other diphenols such as radicals of bis-phenol-A, o, o, o', o'-tetramethyl-, -chloro-, or -bromo bis-phenol-A, hydroquinone, 4,4'-dihydroxydiphenyl, 4,4'-dihydroxydiphenylether, 2,6-dihydroxynaphthalene, or also radicals of hydroxycarboxylic acids such as p-hydroxy benzoic acid. To achieve high dimensional stability under heat in these cases, however, it is advisable to limit the co-components (excluding branching agents and chain breakers) to a maximum of 10 mol%, preferably to a maximum of 5 mol %, in particular to a maximum of 2 mol %, based on the respective dicarboxylic acid component.

The polyesters according to the invention can contain up to 10 mol % of carbonate groups, based on the sum of ester and carbonate groups.

The polyesters according to the invention can contain —COOH, —OH, —$OC_6H_5$, acyloxy or radicals derived from chain terminators as terminal groups. Preferred chain terminators include monofunctional aromatic hydroxyl compounds such as 4-hydroxydiphenyl, nonylphenol, 4-(1,1,3,3-tetramethylbutyl)-phenol, β-naphthol and aromatic monocarboxylic acids such as benzoic acid, diphenyl carboxylic acids and naphthalene carboxylic acids. Chain terminators can be used in quantities of from 0.5 to 5 mol %, based on diphenols in the case of monohydroxyl compounds and based on dicarboxylic acids in the case of monocarboxylic acids.

Trifunctional or higher functional, preferably trifunctional and tetrafunctional, preferably aromatic, monomers such as phloroglucinol, 1,3,5-benzene tricarboxylic acid or 3,5-dihydroxybenzoic acid can be used as branching agents in quantities of from 0.1 to 1 mol %, based on diphenols in the case of polyhydroxyl compounds and based on dicarboxylic acids in the case of poly- and hydroxycarboxylic acids.

The polyesters according to the invention are insoluble in the solvents tested by us, such as, for example, p-chlorophenol, dichloromethane/trifluoroacetic acid (3:1 parts by weight) and phenol/tetrachloroethane (1:1 parts by weight).

The melt viscosity of the polyesters according to the invention, measured at 20° C. below the clearing temperature (i.e. the transition from the liquid crystalline phase into the isotropic phase determined by DSC), but at most at 380° C., using a nozzle having a length to diameter ratio of 20 at a shearing rate of $10^3$ $sec^{-1}$, is generally from 2 to 2000, preferably from 5 to 1000, in particular from 10 to 500 Pa.s.

The polyesters according to the invention have high thermal stability. In isothermal gravimetric analysis under a nitrogen atmosphere using a Perkin-Elmer TGS 2 apparatus, a weight loss of less than 2.5% by weight is determined on all polyesters according to the invention after 30 minutes at 350° C. Many of the polyesters according to the invention demonstrate a weight loss of less than 1% by weight under these conditions. Discolouration was not observed.

Low molecular weight liquid crystalline compounds pass from the ordered liquid crystalline melt into the disordered isotropic melt at the so-called clearing temperature. This phase transition cannot take place without decomposition phenomena in most liquid crystalline polymers, however, owing to their high clearing temperature and their limited thermal stability.

Some of the polyesters according to the invention which have a clearing temperature below 400° C. can be converted into the isotropic phase without decomposition. In microscopic observation, this transition is shown by a disappearance of the brightening effect when the clearing temperature is exceeded. The melt behaviour can be reproduced again after cooling so it is not accompanied by decomposition. The polyesters according to the invention having a clearing temperature of less than 400° C. can therefore also be processed from the isotropic melt.

A further advantage of the polyesters according to the invention resides in their rapid crystallization during cooling from the melt. In investigations involving differential scanning calorimetry (DSC), in a sequence of heating/cooling/heating at 40° C./min respectively during the first and second heating step, almost the same melt enthalpy is observed. In the processing of the thermotropic polyesters according to the invention, therefore, a complicated thermal aftertreatment is not required after the shaping process to increase crystallinity.

The polyesters according to the invention can be produced by reaction of the diphenols or the reactive derivatives thereof, for example the $C_1$-$C_3$-acyl derivatives thereof, preferably the acetates thereof, with the dicarboxylic acids or the reactive derivatives thereof, for example, the dihalides or diesters thereof, preferably the dichlorides, dimethyl esters or diphenyl esters thereof, optionally in the presence of branching agents, chain terminators and/or catalysts, by various processes. Diphenyl carbonate is generally used for producing carbonate groups.

The polyesters according to the invention can be produced at temperatures of from 160° C. to 370° C., the reaction generally commencing at low temperatures and the temperature being raised continuously as the reaction progresses. As the reaction rate declines, a vacuum can be applied, the pressure preferably being lowered from normal pressure to about 0.1 mbar.

According to a preferred process, the diphenol diacetates, which can also be produced in situ, are reacted with the dicarboxylic acids at temperatures of from 160° to 370° C., optionally under reduced pressure.

According to another preferred process, the dicarboxylic acid diesters are reacted with the diphenols at temperatures of from 250° to 370° C. and a pressure of from 0.1 to 1000 mbar.

The starting compounds are generally used in such quantities that carboxyl to hydroxyl functions are in a ratio of from 0.95 to 1.05, preferably 0.98 to 1.02.

The reactions can be carried out in the melt or in inert high-boiling solvents.

Preferred catalysts for polycondensation are Lewis acids and hydrohalide acids; oxides, hydrides, hydroxides, halides, alcoholates, phenolates, salts of inorganic or organic acids (preferably carboxylic acid salts), complex salts or mixed salts of the alkaline earth metals such as magnesium, calcium; the secondary group elements such as vanadium, titanium, manganese, cobalt, nickel, zinc, lanthanum, cerium, zirconium or the elements of other groups of the periodic system such as germanium, tin, lead and antimony or also the alkali metals or alkaline earth metals themselves, in particular sodium, sodium hydroxide, lithium acetate, magnesium acetate, cobalt acetate, zinc acetate, calcium benzoate, magnesium acetylacetonate, zinc acetylacetonate, vanadyl-$C_1$-$C_8$-alkoxides, titanium alkoxides such as titanium tetrabutylate, titanium tetrapropylate, alkoxy titanium silicates, zirconium butylate, zirconium propylate, titanium tetraphenolate, sodium phenolate, germanium, dioxide, antimony trioxide, dialkyl and diaryl tin oxide, dibutyl tin diacetate, dibutyl dimethoxy tin. Magnesium, manganese, sodium, potassium and zinc acetate, titanium tetrabutylate, titanium tetrapropylate and sodium phenolate are particularly preferred. The quantities of catalyst are preferably from 0.001 to 1% by weight, in particular from 0.01 to 0.2% by weight, based on the total weight of the monomers used.

The thermotropic polyesters according to the invention can advantageously be processed thermoplastically into injection mouldings, filaments, fibres, strips and films owing to their relatively low melt viscosity and their low melting temperature. A molecular orientation is achieved owing to the shearing forces occurring during thermoplastic processing, this being influenced greatly by the intensity of the shearing forces. Furthermore, they exhibit a pronounced structural viscosity, i.e. such that the melt viscosity falls markedly when the shearing forces are increased. Suitable processing methods include injection moulding, extrusion, pressing and melt spinning.

Mouldings having a high tensile strength, high dimensional stability under heat and high dimensional stability can be produced from the polyesters according to the invention. As the polyesters are extremely resistant to chemicals and flame-resistant, they are eminently suitable for the production of:

electrical articles such as insulators, printed circuits, contact plugs, rotor components, coverings for integrated circuits, parts of chemical engineering apparatus, such as tubes, container linings, rotors, anti-friction bearings, seals, parts for aircraft interiors, parts for medical equipment such as components of air-conditioning equipment, valve parts.

However, the polyesters according to the invention can also be used as covering and coating material (in powder form or dispersed). They are most suitable for the production of reinforced or filled moulding compositions having a reinforcement or filler content of from 5 to 65% by weight, based on the reinforced or filled moulding composition.

The invention also relates to the use of the new polyesters for the production of mouldings, filaments, fibres and films.

The percentages in the following Examples are based on weight in each case.

EXAMPLES

The dimensional stability under heat was measured by determining the Vicat-B-softening temperature in accordance with DIN No. 53 460 (ASTM D No. 1525).

Example 1

The following substances were weighed into a melt condensation apparatus which had been purged with nitrogen and thoroughly heated and consisted of a 250 ml surface-ground vessel having a surface-ground cover, stirrer, nitrogen inlet and distillation attachment:

0.32 mol $\hat{=}$ 86.5 g of 1,6-bis-(4-hydroxyphenyl)-n-hexane, 0.32 mol $\hat{=}$ 101.9 g of terephthalic acid diphenylester, and 0.2 g of titanium tetraisopropylate solution in chlorobenzene (1%).

The reaction mixture was melted at 240° C. using a salt bath under a light nitrogen stream, and the elimination of phenol was initiated by raising the temperature to 270° C. and reducing the pressure to 250 mbar. Distillation of phenol was carried out over a period of 3.5 hours by gradually raising the temperature to 330° C. and reducing the pressure to 20 mbar, during which process the initially clear melt became cloudy. The quantity of distillate was 54.2 g ($\hat{=}$90% of the theoretical amount) at this point. By further reduction of the pressure to 0.1 mbar, the elimination of phenol was completed within 30 minutes (total quantity of distillate: 59.0 g $\hat{=}$98% of the theoretical amount).

Finally, the temperature was raised to 340° C. for a further 2 hours.

A light beige polyester was obtained.

An anisotropic melt was observed under the polarisation microscope in the range between 320° C. and 400° C. An isotropic melt was present above 400° C.

During a heating/cooling/heating sequence at 40° C./min in each case, a total melt enthalpy of 8.3 cal/g was determined during the first heating step and 7.9 cal/g during the second heating step in DSC investigations. The polyester therefore crystallized very rapidly.

The softening temperature of the polyester (measured in accordance with Vicat B) was 205° C.

Thermogravimetric analysis gave a weight loss of 0.9% after 30 minutes at a constant temperature of 350° C.

Example 2

The following substances were weighed into the reaction apparatus described in Example 1:

0.32 mol≅104.5 g of 1,10-bis-(4-hydroxyphenyl)-n-decane, 0.32 mol≅101.9 g of terephthalic acid diphenylester, and 0.2 g of titanium tetraisopropylate solution in chlorobenzene (1%).

The same reaction conditions as in Example 1 were observed with the exception that the final temperature was 350° C. A total of 57.8 g (≅96% of the theoretical amount) of phenol was distilled off. Towards the end of the reaction, the polyester obtained formed a markedly viscous melt which solidified rapidly to a light beige mass during cooling.

An anisotropic phase was observed in the range of from 275° to 304° C. under the polarisation microscope. The melt was optically isotropic above 305° C.

During a heating/cooling/heating sequence at 40° C./min respectively, DSC measurement revealed total melt enthalpies of 6.8 g cal/g during the first heating step and 6.5 cal/g during the second heating step. Thus, the polyester had a high crystallization rate.

The softening temperature of the polyester (measured in accordance with Vicat B) was 165° C.

At a constant temperature of 350° C., the polyester suffered a weight loss of 2.2% within 30 minutes.

Example 3

The following substances were weighed into the reaction apparatus described in Example 1:

0.32 mol≅95.5 g of 1,8-bis-(4-hydroxyphenyl)-n-octane, 0.32 mol≅101.9 g of terephthalic acid diphenylester, and 0.2 g of titanium tetraisopropylate solution in chlorobenzene (1%).

58.1 g (≅96.5% of the theoretical amount of phenol were removed while maintaining the reaction conditions described under Example 1. A cloudy, low viscosity melt which solidified rapidly to a beige mass during cooling was formed at a final temperature of 340° C.

An anisotropic phase was demonstrated in the temperature range of from 298° and 355° C. by differential scanning calorimetry (DSC) and polarization microscopy. An isotropic melt was present above this temperature.

The softening temperature of the polyester (measured in accordance with Vicat B) was 182° C.

At a constant test temperature of 350° C., the polyester suffered a weight loss of 1.3% within 30 minutes.

Example 4

The following substances were weighed into the reaction apparatus described in Example 1:

0.45 mol≅121.7 g of 1,6-bis-(4-hydroxyphenyl)-n-hexane, 0.45 mol≅74.8 g of terephthalic acid, 1.08 mol≅110.3 g of acetic anhydride, 0.05 g of magnesium acetate anhydrous, and 0.05 g of germanium dioxide.

The suspension was heated to 170° C. with a salt bath while stirring, a light nitrogen stream being passed over continuously. The distillation of acetic acid beginning at this temperature was maintained for a period of 4 hours by raising the temperature gradually to 340° C. (113 g of distillate). At this point, the reaction mixture was a clear melt. The pressure was then lowered to 20 mbar in the course of 1 hour and 0.5 mbar within a further hour. The melt was stirred for a further hour under these conditions and was then left to cool under nitrogen. A light beige coloured thermotropic polyester having the same physical properties as the product described in Example 1 was obtained.

Comparative Example

The following substances were weighed into the reaction apparatus described in Example 1:

0.30 mol≅64.3 g of 1,2-bis-(4-hydroxyphenyl)-ethane, 0.30 ml≅95.5 g of terephthalic acid diphenyl ester, and 0.2 g of titanium tetraisopropylate solution in chlorobenzene (1%).

The reaction mixture was melted at 220° C. using a salt bath under a light nitrogen stream, and the elimination of phenol was initiated by raising the temperature to 270° C. and reducing the pressure to 290 mbar. Distillation of phenol was carried out over a period of 3 hours by gradually raising the temperature to 320° C. and reducing the pressure to 150 mbar, during which process the initially clear melt became cloudy and towards the end of this period became solid. Raising of the temperature to 360° C. did not result in re-melting of the reduction mixture. By further reduction of the pressure first to 20 mbar and then to 0.1 mbar, the elimination of phenol was completed within further 3 hours (total quantity of destillate: 46.6 g=83% of the theoretical amount). During this period of time, a strong sublimation took place.

A light yellow brittle polyester was obtained.

Melting of the obtained polyester under a polarization microscope could not be observed up to a temperature of 400° C. Also, a softening temperature of the polyester could not be determined up to this temperature.

We claim:

1. A thermotropic polyester comprising copolymerized aromatic dicarboxylic acid moieties and diphenol moieties wherein at least 90 mol% of the copolymerized diphenol moieties correspond to the formula (I):

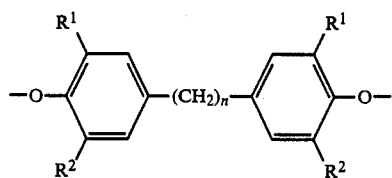

wherein $R^1$, $R^2$ represent hydrogen, $C_1$-$C_4$-alkyl, $C_1$-$C_4$-alkoxy, phenyl or halogen and n is an integer of from 6 to 12 and wherein the temperature of the transition from the crystalline into the liquid crystalline phase, melting point, determined by differential scanning calorimetry is less than 370° C.

2. Polyester according to claim 1 wherein at least 95 mol % of the diphenol moieties correspond to formula (I).

3. Polyester according to claim 1 wherein 100 mol % of the diphenol moieties correspond to formula (I).

4. Polyester according to claim 1 wherein the aromatic dicarboxylic acid moieties are terephthalic acid moieties.

5. A polyester according to claim 1 having a dimensional stability under heat (as measured in accordance with ASTM D No. 1525) of at least 150° C.

6. Polyester according to claim 1 having a weight loss in isothermal gravimetric analysis of at most 3% by weight after 30 minutes at 350° C.

7. Polyester according to claim 1 in the form of a moulding, a filament, a fiber or a film.

* * * * *